(12) United States Patent
Moore

(10) Patent No.: US 7,027,977 B2
(45) Date of Patent: Apr. 11, 2006

(54) INDEXING PRODUCTIONS FOR USE IN A LEFT-CORNER CHART PARSER WHICH PARSES INPUT TEXT CONTAINING INPUT SYMBOLS

(75) Inventor: Robert C. Moore, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/927,360

(22) Filed: Aug. 26, 2004

(65) Prior Publication Data
US 2005/0027510 A1    Feb. 3, 2005

Related U.S. Application Data

(62) Division of application No. 09/510,020, filed on Feb. 22, 2000.

(51) Int. Cl.
*G06F 17/30* (2006.01)

(52) U.S. Cl. .................... 704/10; 707/5; 704/4

(58) Field of Classification Search .............. None
See application file for complete search history.

(56) References Cited

U.S. PATENT DOCUMENTS

| | | | |
|---|---|---|---|
| 5,083,268 A | 1/1992 | Hemphill et al. | 706/11 |
| 5,687,384 A * | 11/1997 | Nagase | 704/9 |
| 5,903,860 A | 5/1999 | Maxwell, et al. | 704/9 |
| 6,128,596 A * | 10/2000 | Mackie | 704/257 |
| 6,785,643 B1 * | 8/2004 | Hayosh et al. | 704/9 |

OTHER PUBLICATIONS

Communications of the ACM. Programming Languages "On the Relative Efficiencies of Context-Free Grammar Recognizers" by T.V. Griffiths and S.R. Petrick Air Force Cambridge Research Laboratories, Bedford Mass. vol. 8/No. 5/May, 1965, pp. 289-300.

Third Conference of the European Chapter of the Association for Computational Linguistic. "A comparison of rule-invocation strategies in context-free chart parsing", by Mats Wiren. Apr. 1987, pp. 226-233.

Information Processing Letters: Devoted to the Rapid Publication of Short Contributions to Information. A Recursive Ascent Earley Parser, by Rene Leemarkers, Feb. 1992, pp. 87-91.

ACM Transactions on Programming Languages and System. "An Improved Context-Free Recognizer" by Susan L. Grahm, Michael A. Harrison, and Walter L. Ruzzo, University of California at Berkley, vol. 2, No. 3, Jul. 1980, pp. 415-462.

(Continued)

*Primary Examiner*—Abul K. Azad
(74) *Attorney, Agent, or Firm*—Joseph R. Kelly; Westman, Champlin & Kelly, P.A.

(57) ABSTRACT

Different embodiments of the present invention provide improvements to left-corner chart parsing. The improvements include a specific order of filtering checks, transforming the grammar using bottom-up prefix merging, indexing productions first based on input symbols, grammar flattening, and annotating chart edges for the extraction of parses.

9 Claims, 12 Drawing Sheets

OTHER PUBLICATIONS

"Linguistic Parsing and Programming Transformations", Chapter 2, Generalized Left-Corner Parsing, by Mark Jan Nederhof, Oct. 1966.

* cited by examiner

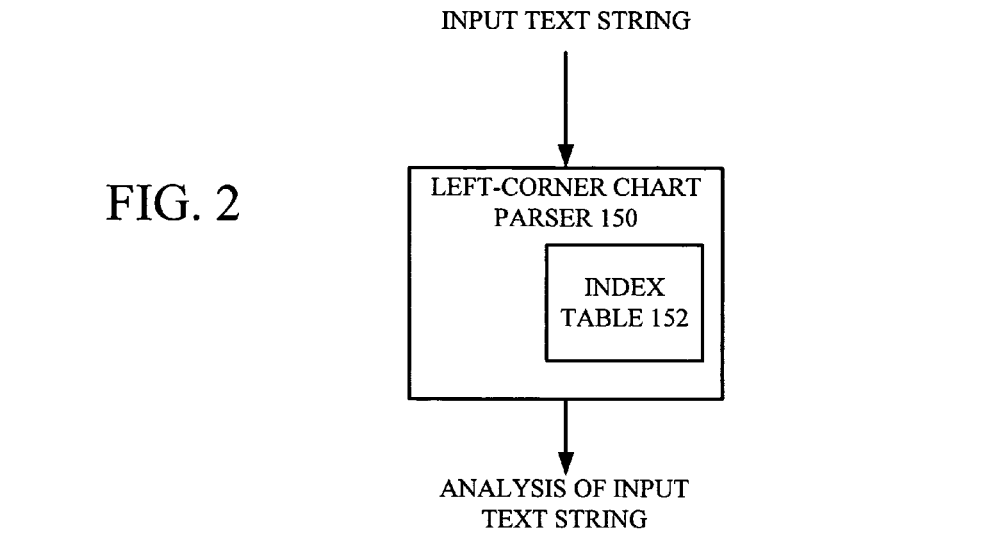

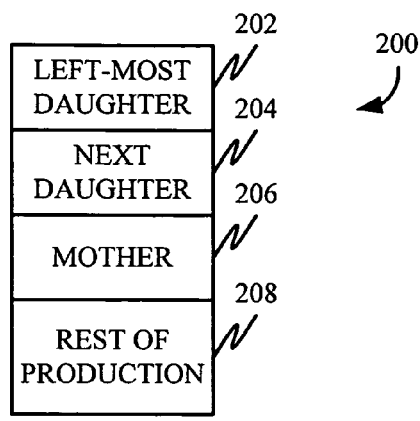
FIG. 6A
FIG. 6B
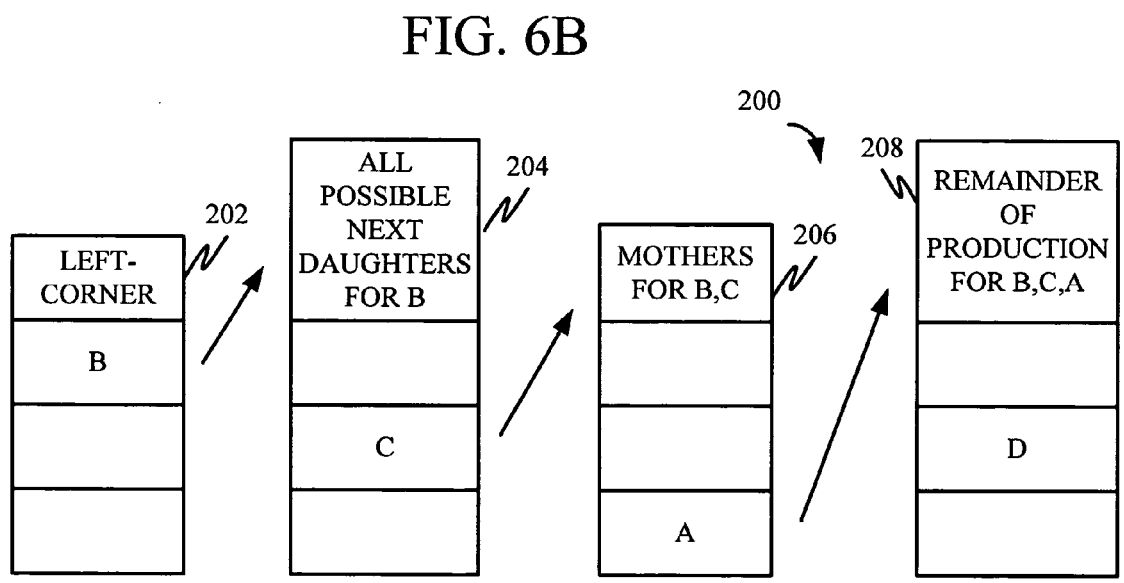

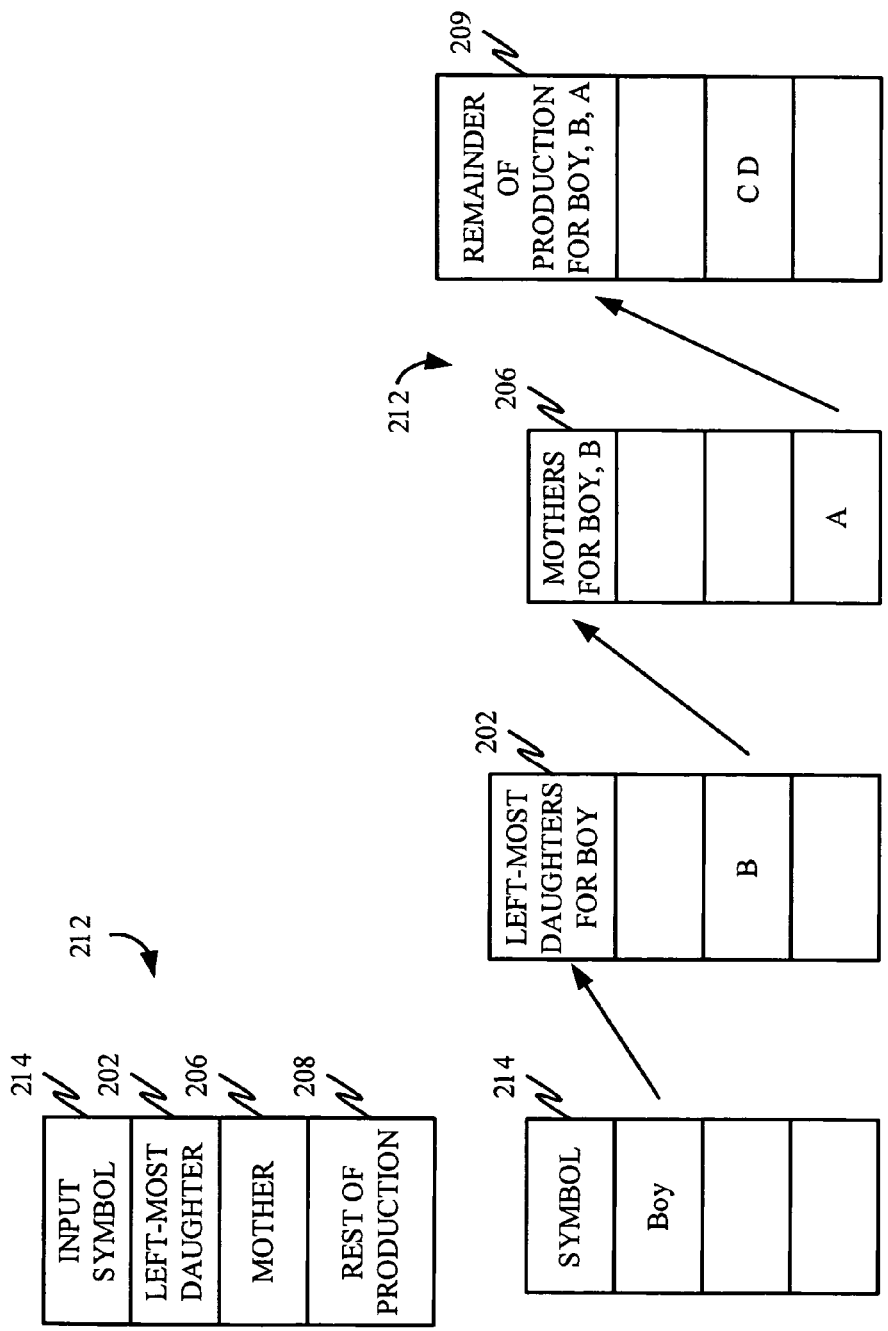

INDEXING PRODUCTIONS FOR USE IN A LEFT-CORNER CHART PARSER WHICH PARSES INPUT TEXT CONTAINING INPUT SYMBOLS

REFERENCE TO CO-PENDING APPLICATION

This is a divisional of application Ser. No. 09/510,020, filed Feb. 22, 2000.

Reference is hereby made to co-pending U.S. patent application Ser. No. 09/441,685, entitled ELIMINATION OF LEFT RECURSION FROM CONTEXT-FREE GRAMMARS, filed on Nov. 16, 1999.

BACKGROUND OF THE INVENTION

The present invention deals with parsing text. More specifically, the present invention deals with improvements in left-corner chart parsing.

Parsing refers to the process of analyzing a text string into its component parts and categorizing those parts. This can be part of processing either artificial languages (C++, Java, HTML, XML, etc.) or natural languages (English, French, Japanese, etc.). For example, parsing the English sentence, the man with the umbrella opened the large wooden door, would normally involve recognizing that:

opened is the main verb of the sentence, the subject of opened is the noun phrase the man with the umbrella, the object of opened is the noun phrase the large wooden door, with the man with the umbrella and the large wooden door being further analyzed into their component parts. The fact that parsing is nontrivial is illustrated by the fact that the sentence contains the substring the umbrella opened, which in isolation could be a full sentence, but in this case is not even a complete phrase of the larger sentence.

Parsing by computer is sometimes performed by a program that is specific to a particular language, but often a general-purpose parsing algorithm is used with a formal grammar for a specific language to parse strings in that language. That is, rather than having separate programs for parsing English and French, a single program is used to parse both languages, but it is supplied with a grammar of English to parse English text, and a grammar of French to parse French text.

Perhaps the most fundamental type of formal grammar is context-free grammar. A context-free grammar consists of terminal symbols, which are the tokens of the language; a set of nonterminal symbols, which are analyzed into sequences of terminals and other nonterminals; a set of productions, which specify the analyses; and a distinguished "top" nonterminal symbol, which specifies the strings that can stand alone as complete expressions of the language.

The productions of a context-free grammar can be expressed in the form $A \rightarrow X_1 \ldots X_n$ where A is a single nonterminal symbol, and $X_1 \ldots X_n$ is a sequence of n terminals and/or nonterminals. The interpretation of a production $A \rightarrow X_1 \ldots X_n$ is that a string can be categorized by the nonterminal A if it consists of a sequence of contiguous substrings that can be categorized by $X_1 \ldots X_n$.

The goal of parsing is to find an analysis of a string of text as an instance of the top symbol of the grammar, according to the productions of the grammar. To illustrate, suppose we have the following grammar for a tiny fragment of English:

S→NP VP
NP→Name
Name→john
Name→mary
VP→V NP
V→likes

In this grammar, terminals are all lower case, nonterminals begin with an upper case letter, and S is the distinguished top symbol of the grammar. The productions can be read as saying that a sentence can consist of a noun phrase followed by a verb phrase, a noun phrase can consist of a name, john and mary can be names, a verb phrase can consist of a verb followed by a noun phrase, and likes can be a verb. It should be easy to see that the string john likes mary can be analyzed as a complete sentence of the language defined by this grammar according the following structure:

(S: (NP: (Name: john))
  (VP: (V: likes)
    (NP: (Name: mary))))

For parsing natural language, often grammar formalisms are used that augment context-free grammar in some way, such as adding features to the nonterminal symbols of the grammar, and providing a mechanism to propagate and test the values of the features. For example, the nonterminals NP and VP might be given the feature number, which can be tested to make sure that singular subjects go with singular verbs and plural subjects go with plural verbs. Nevertheless, even natural-language parsers that use one of these more complex grammar formalisms are usually based on some extension of one of the well-known algorithms for parsing with context-free grammars.

Grammars for artificial languages, such as programming languages (C++, Java, etc.) or text mark-up languages (HTML, XML, etc.) are usually designed so that they can be parsed deterministically. That is, they are designed so that the grammatical structure of an expression can be built up one token at a time without ever having to guess how things fit together. This means that parsing can be performed very fast and is rarely a significant performance issue in processing these languages.

Natural languages, on the other hand, cannot be parsed deterministically, because it is often necessary to look far ahead before it can be determined how an earlier phrase is to be analyzed. Consider for example the two sentences:

Visiting relatives often stay too long.

Visiting relatives often requires a long trip.

In the first sentence, visiting relatives refers to relatives who visit, while in the second sentence it refers to the act of paying a visit to relatives. In any reasonable grammar for English, these two instances of visiting relatives would receive different grammatical analyses. The earliest point in the sentences where this can be determined, however, is after the word often. It is hard to imagine a way to parse these sentences, such that the correct analysis could be assigned with certainty to visiting relatives before it is combined with the analysis of the rest of the sentence.

The existence of nondeterminacy in parsing natural languages means that sometimes hundreds, or even thousands, of hypotheses about the analyses of parts of a sentence must be considered before a complete parse of the entire sentence is found. Moreover, many sentences are grammatically ambiguous, having multiple parses that require additional information to chose between. In this case, it is desirable to be able to find all parses of a sentence, so that additional knowledge sources can be used later to make the final selection of the correct parse. The high degree of nondeterminacy and ambiguity in natural languages means that parsing natural language is computationally expensive, and as grammars are made more detailed in order to describe the structure of natural-language expressions more accurately, the complexity of parsing with those grammars increases. Thus in almost every application of natural-language processing, the computation time needed for parsing is a serious issue, and faster parsing algorithms are always desirable to improve performance.

"Chart parsing" or "tabular parsing" refers to a broad class of efficient parsing algorithms that build a collection of data structures representing segments of the input partially or completely analyzed as a phrase of some category in the grammar. These data structures are individually referred to as "edges" and the collection of edges derived in parsing a particular string is referred to as a "chart". In these algorithms, efficient parsing is achieved by the use of dynamic programming, which simply means that if the same chart edge is derived in more than one way, only one copy is retained for further processing.

The present invention is directed to a set of improvements to a particular family of chart parsing algorithms referred to as "left-corner" chart parsing. Left-corner parsing algorithms are distinguished by the fact that an instance of a given production is hypothesized when an instance of the left-most symbol on the right-hand side of the production has been recognized. This symbol is sometimes called the "left corner" of the production; hence, the name of the approach. For example, if VP→V NP is a production in the grammar, and a terminal symbol of category V has been found in the input, then a left-corner parsing algorithm would consider the possibility that the V in the input should combine with a NP to its right to form a VP.

SUMMARY OF THE INVENTION

Different embodiments of the present invention provide improvements to left-corner chart parsing. The improvements include a specific order of filtering checks, transforming the grammar using bottom-up prefix merging, indexing productions first based on input symbols, grammar flattening, and annotating chart edges for the extraction of parses.

BRIEF DESCRIPTION OF THE DRAWINGS

FIG. 2 is a block diagram of a left-corner chart parser.

FIGS. 4 and 5 are flow diagrams illustrating a bottom-up prefix merging transformation in accordance with one embodiment of the present invention.

FIGS. 6A and 6B illustrate a data structure used in indexing productions and a method of using that data structure.

FIGS. 7A and 7B illustrate a data structure used in indexing productions and a method of using that data structure in accordance with one embodiment of the present invention.

DETAILED DESCRIPTION OF THE ILLUSTRATIVE EMBODIMENTS OVERVIEW OF ENVIRONMENT

The discussion of FIG. 1 below is simply to set out but one illustrative environment in which the present invention can be used, although it can be used in other environments as well.

Figure 1:
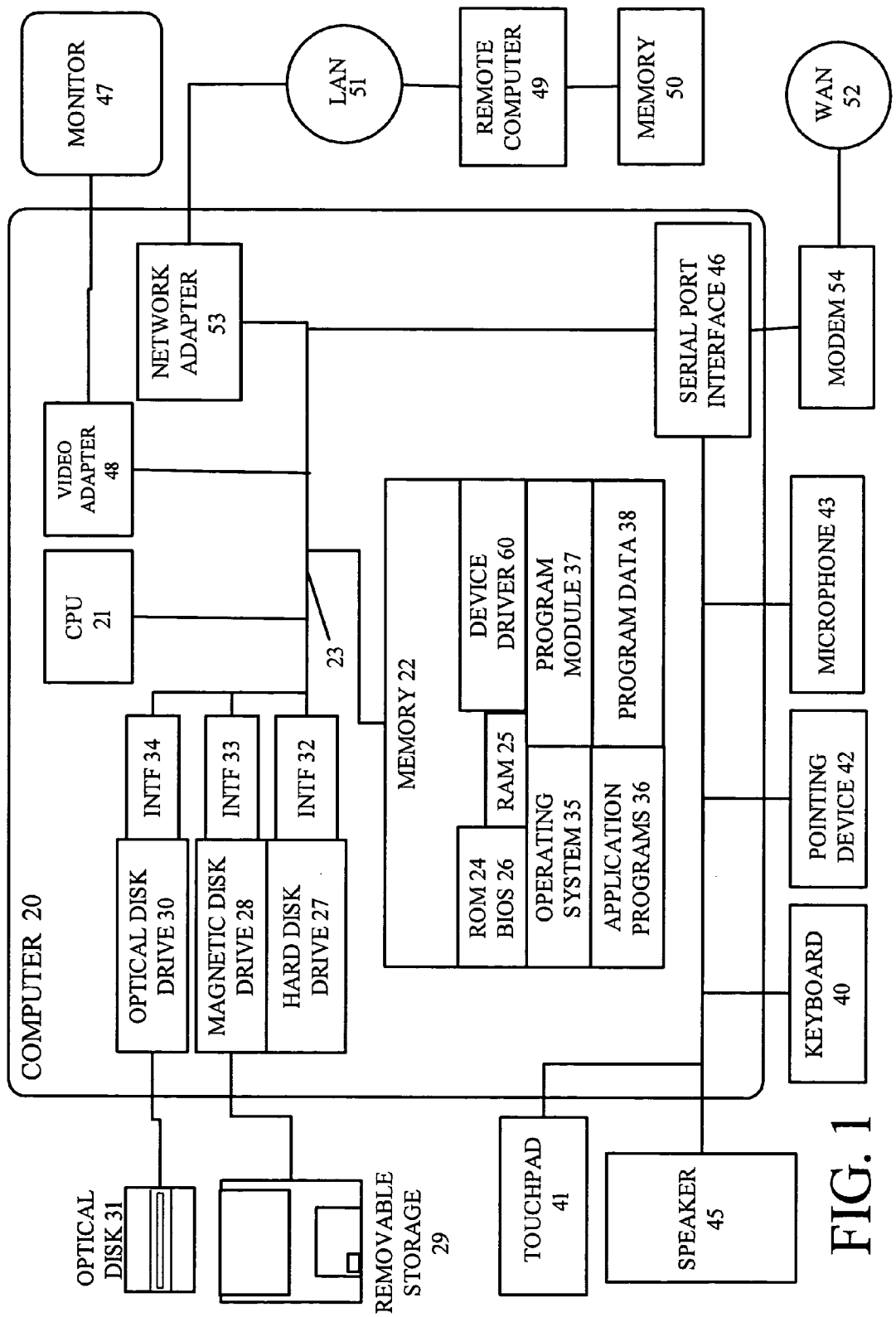
FIG. 1 is a block diagram of an exemplary environment in which the present invention can be implemented.

FIG. 1 is a block diagram of a computer 20 in accordance with one illustrative embodiment of the present invention. FIG. 1 and the related discussion are intended to provide a brief, general description of a suitable computing environment in which the invention may be implemented. Although not required, the invention will be described, at least in part, in the general context of computer-executable instructions, such as program modules, being executed by a personal computer. Generally, program modules include routine programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

In FIG. 1, an exemplary system for implementing the invention includes a general purpose computing device in the form of a conventional personal computer 20, including processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 a random access memory (RAM) 25. A basic input/output 26 (BIOS), containing the basic routine that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 45 that is coupled to the system bus 23, but may be connected by other interfaces, such as a sound card, a parallel port, a game port or a universal serial bus (USB). A monitor 47 or other type of display device is also connected to the system bus 23 via an interface, such as a video adapter 48. In addition to the monitor 47, personal computers may typically include other peripheral output devices such as a speaker and printers (not shown).

The personal computer 20 may operate in a networked environment using logic connections to one or more remote computers, such as a remote computer 49. The remote computer 49 may be another personal computer, a server, a router, a network PC, a peer device or other network node, and typically includes many or all of the elements described above relative to the personal computer 20, although only a memory storage device 50 has been illustrated in FIG. 1. The logic connections depicted in FIG. 1 include a local are network (LAN) 51 and a wide area network (WAN) 52. Such networking environments are commonplace in offices, enterprise-wide computer network intranets and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a network environment, program modules depicted relative to the personal computer 20, or portions thereof, may be stored in the remote memory storage devices. It will be appreciated that the network connections shown are exemplary and other means of establishing a communications link between the computers may be used.

Overview of Parsing Notation and Rules

FIG. 2 is a simplified block diagram of a left-corner chart parser. FIG. 2 illustrates that left-corner chart parser 150 receives an input text string and provides at its output an analysis of the input text string. An exemplary input text string, and an exemplary analysis, are discussed below in greater detail. FIG. 2 also illustrates that, part of left-corner chart parser 150 includes a left-corner index table 152 which is used generating a chart, as is also described in greater detail below.

In the notation that follows, nonterminals, which will sometimes be referred to as categories, will be designated by "low order" upper-case letters (A, B, etc.); and terminals will be designated by lower-case letters. The notation ai indicates the ith terminal symbol in the input string. "High order" upper-case letters (X, Y, Z) denote single symbols that could be either terminals or nonterminals, and Greek letters denote (possibly empty) sequences of terminals and/or nonterminals. For a grammar production $A \rightarrow B_1 \ldots B_n$ we will refer to A as the mother of the production and to $B_1 \ldots B_n$ as the daughters of the production. The nonterminal symbol S is used as the top symbol of the grammar, which subsumes all sentences allowed by the grammar.

The term "item", as used herein, means an instance of a grammar production with a "dot" somewhere on the right-hand side to indicate how many of the daughters have been recognized in the input, e.g., $A \rightarrow B_1.B_2$. An "incomplete item" is an item with at least one daughter to the right of the dot, indicating that at least one more daughter remains to be recognized before the entire production is matched; and a "complete item" is an item with no daughters to the right of the dot, indicating that the entire production has been matched.

The terms "incomplete edge" or "complete edge" mean an incomplete item or complete item, plus two input positions indicating the segment of the input covered by the daughters that have already been recognized. These will be written as (e.g.) $<A \rightarrow B_1B_2.B_3,i,j>$, which means that the sequence $B_1B_2$ has been recognized starting at position i and ending at position j, and has been hypothesized as part of a longer sequence ending in $B_3$, which is classified a phrase of category A. The symbol immediately following the dot in an incomplete edge is often of particular interest. These symbols are referred to as "predictions". Positions in the input will be numbered starting at 0, so the ith terminal of an input string spans position i−1 to i. Items and edges, none of whose daughters have yet been recognized, are referred to as "initial".

Left-corner (LC) parsing depends on the left-corner relation for the grammar, where X is recursively defined to be a left corner of A if X=A, or the grammar contains a production of the form $B \rightarrow X\alpha$, where B is a left corner of A. This relation is normally precompiled and indexed so that any pair of symbols can be checked in essentially constant time.

A chart-based LC parsing algorithm can be defined by the following set of rules for populating the chart:

1. For every grammar production with S as its mother, $S \rightarrow \alpha$, add $<S \rightarrow .\alpha, 0, 0>$ to the chart.
2. For every pair of edges of the form $<A \rightarrow \alpha.X\beta,i,k>$ and $<X \rightarrow \gamma.,k,j>$ in the chart, add $<A \rightarrow \alpha X.\beta,i,j>$ to the chart.
3. For every edge of the form $<A \rightarrow \alpha.a_j\beta,i,j-1>$ in the chart, where $a_j$ is the jth terminal in the input, add $<A \rightarrow \alpha a_j.\beta,i,j>$ to the chart.
4. For every edge of the form $<X \rightarrow \gamma.,k,j>$ in the chart and every grammar production with X as its left-most daughter, of the form $B \rightarrow X\delta$, if there is an incomplete edge in the chart ending at k, $<A \rightarrow \alpha.C\beta,i,k>$, such that B is a left corner of C, add $<B \rightarrow X.\delta, k, j>$ to the chart.
5. For every input terminal $a_j$ and every grammar production with $a_j$ as its left-most daughter, of the form $B \rightarrow a_j\delta$, if there is an incomplete edge in the chart ending at j−1, $<A \rightarrow \alpha.C\beta,i,j-1>$, such that B is a left corner of C, add $<B \rightarrow a_j.\delta,j-1,j>$ to the chart.

Note that for Rules 4 and 5 to be executed efficiently, parsing should be performed strictly left-to-right, so that every incomplete edge ending at k has already been computed before any left-corner checks are performed for new edges proposed from complete edges or input terminals starting at k. Apart from this constraint that requires every edge ending at any point k to be generated before any edges ending at points greater than k, individual applications of Rules 1–5 may be intermixed in any order. An input string is successfully parsed as a sentence by this algorithm if the chart contains an edge of the form $<S \rightarrow \alpha.,0,n>$ when the algorithm terminates.

This formulation of left-corner chart parsing is essentially known. Another prior publication describes a similar algorithm, but formulated in terms of a graph-structured stack of the sort generally associated with another form of parsing called generalized LR parsing, rather than in terms of a chart.

Several additional optimizations can be added to this basic schema. One prior technique adds bottom-up filtering of incomplete edges based on the next terminal in the input. That is, no incomplete edge of the form $<A \rightarrow \alpha.X\beta,i,j>$ is added to the chart unless $a_{j+1}$ is a left corner of X. Another prior author proposes that, rather than iterate over all the incomplete edges ending at a given input position each time a left-corner check is performed, compute just once for each input position the set of nonterminal predictions of the incomplete edges ending at that position, and iterate over that set for each left-corner check at the position. With this optimization, it is no longer necessary to add initial edges to the chart at position 0 for productions of the form $S \rightarrow \alpha$. If $P_i$ denotes the set of predictions for position i, we simply let $P_0 = \{S\}$.

Another prior optimization results from the observation that in prior context-free grammar parsing algorithms, the daughters to the left of the dot in an item play no role in the parsing algorithm; thus the representation of items can ignore the daughters to the left of the dot, resulting in fewer distinct edges to be considered. This observation is equally true for left-corner parsing. Thus, instead of $A \rightarrow B_1 B_2.B_3$, one writes simply $A \rightarrow .B_3$. Note that with this optimization, $A \rightarrow .$ becomes the notation for an item all of whose daughters have been recognized; the only information it contains being just the mother of the production. The present discussion proceeds therefore by writing complete edges simply as $<A,i,j>$, rather than $<A \rightarrow .,i,j>$. One can also unify the treatment of terminal symbols in the input with complete edges in the chart by adding a complete edge $<a_i,i-1,i>$, to the chart for every input terminal $a_i$.

Taking all these optimizations together, we can define a known optimized left-corner parsing algorithm by the following set of parsing rules:

1. Let $P_0 = \{S\}$.
2. For every input position j>0, let $P_j = \{B|$ there is an incomplete edge in the chart ending at j, of the form $<A \rightarrow .B\alpha, i, j>\}$.
3. For every input terminal $a_i$, add $<a_i,i-1,i>$ to the chart.
4. For every pair of edges $<A \rightarrow .XY\alpha,i,k>$ and $<X,k,j>$ in the chart, if $a_{j+1}$ is a left corner of Y, add $<A \rightarrow .Y\alpha, i,j>$ to the chart.
5. For every pair of edges $<A \rightarrow .X,i,k>$ and $<X,k,j>$ in the chart, add $<A,i,j>$ to the chart.
6. For every edge $<X,k,j>$ in the chart and every grammar production with X as its left-most daughter, of the form $A \rightarrow XY\alpha$, if there is a $B \in P_k$ such that A is a left corner of B, and $a_{j+1}$ is a left corner of Y, add $<A \rightarrow .Y\alpha,k,j>$ to the chart.
7. For every edge $<X,k,j>$ in the chart and every grammar production with X as its only daughter, of the form $A \rightarrow X$, if there is a $B \in P_k$ such that A is a left corner of B, add $<A,k,j>$ to the chart.

Order of Filtering Checks

Note that in Rule 6, the top-down left-corner check on the mother of the proposed incomplete edge and the bottom-up left-corner check on the prediction of the proposed incomplete edge are independent of each other, and therefore could be performed in either order. For each proposed edge, the top-down check determines whether the mother A of the grammar production is a left-corner of any prediction at input position k, in order to determine whether the production is consistent with what has already been recognized. This requires examining an entry in a left-corner table for each of the elements of the prediction list (i.e., the predictions in the incomplete edges), until a check succeeds or the list is exhausted. The bottom-up check determines whether the terminal in the j+1st position $(a_{j+1})$ of the input is a left-corner of Y. This requires examining only one entry in the left-corner table.

Therefore, in accordance with one embodiment of the present invention, the bottom-up check is performed before the top-down check, since the top-down check need not be performed if the bottom-up check fails. It has been found experimentally that performing the filtering steps in this order is always faster, by as much as 31%.

Figure 3A:
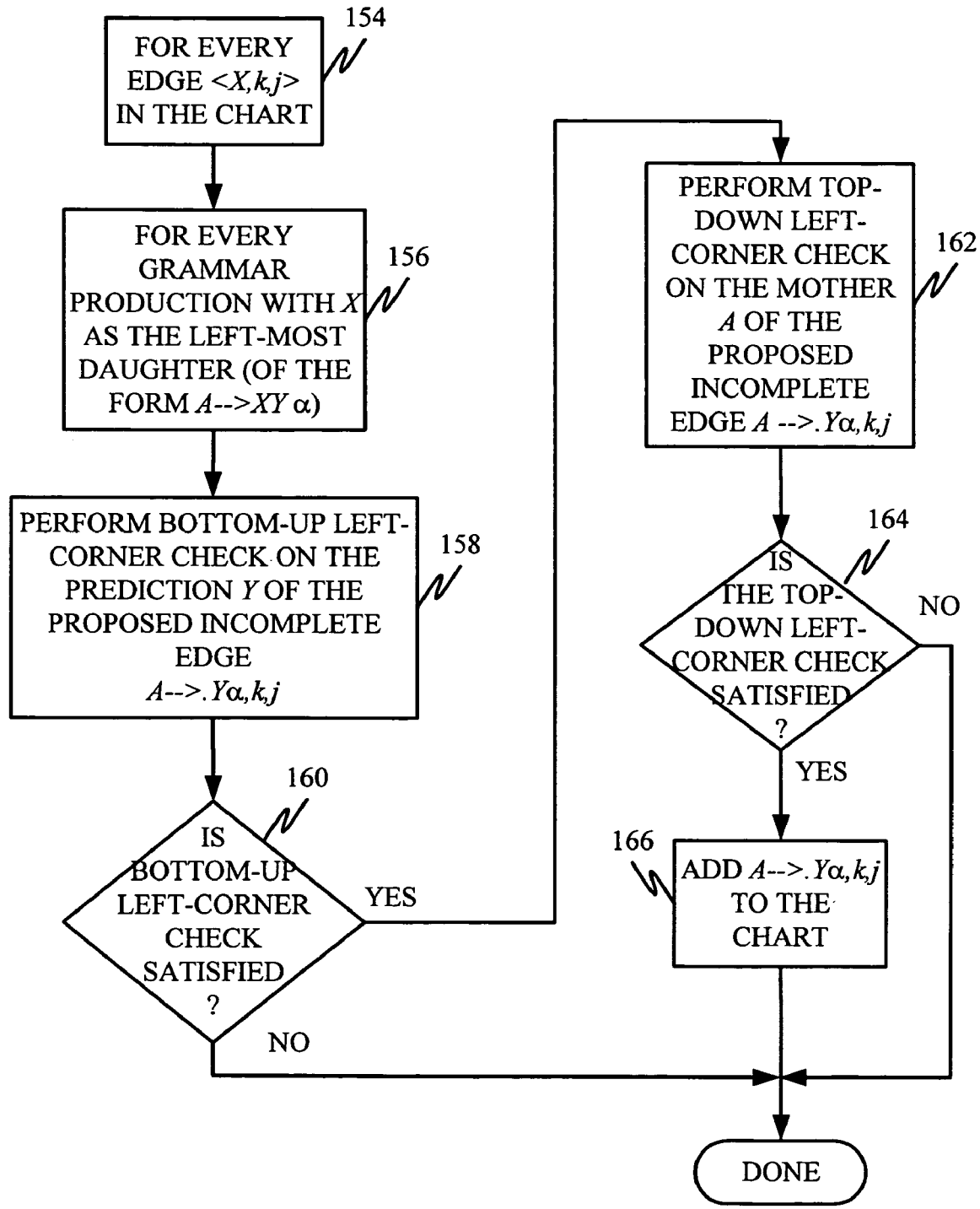
FIGS. 3A–3C are flow diagrams illustrating the performance of a bottom-up left-corner check and a top-down left-corner check in accordance with one embodiment of the present invention.
Figure 3B:
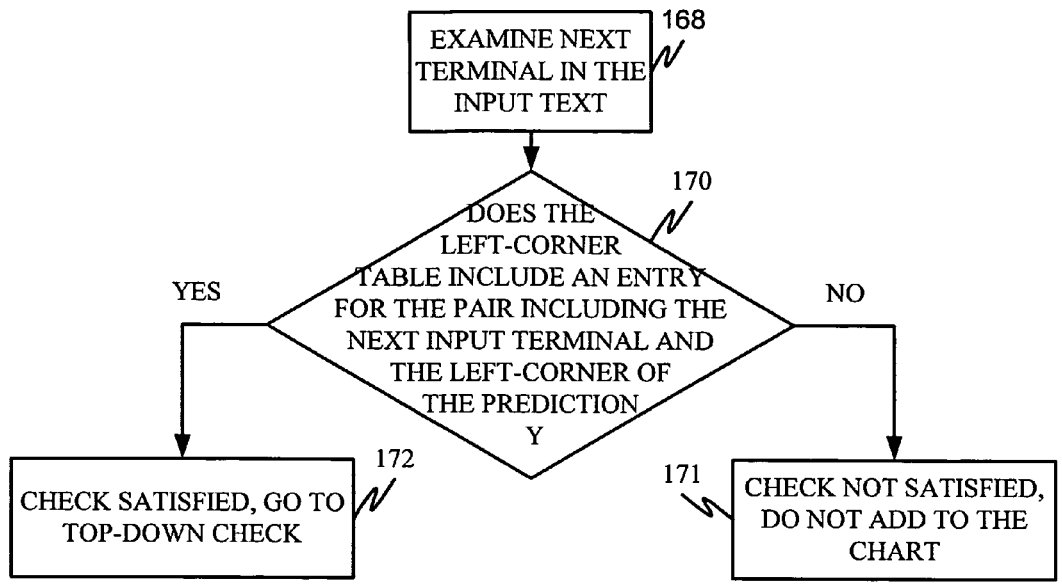
Figure 3C:
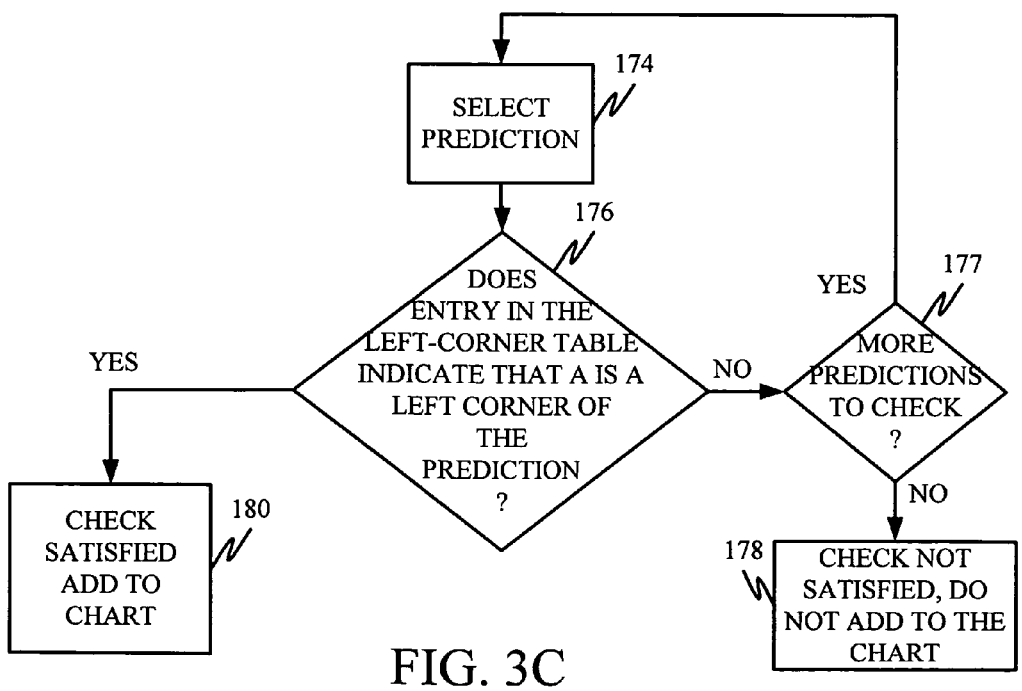

FIGS. 3A–3C are flow diagrams that illustrate the performance of the filtering (or checking) steps in greater detail in accordance with one embodiment of the present invention. FIG. 3 illustrates that, for every edge of the form $<X,k,j>$ in the chart being constructed, and for every grammar production with X as its left-most daughter, of the form $A \rightarrow XY\alpha$, the bottom-up left-corner filtering step is performed on the prediction Y of the proposed incomplete edge $<A \rightarrow .Y\alpha,k,j>$. This is indicated by blocks 154, 156 and 158 in FIG. 3A. Next, it is determined whether the bottom-up left-corner check has been satisfied. This is indicated by block 160. If the check has not been satisfied, then the proposed incomplete edge is not added to the chart and the filtering step is completed. However, if the bottom-up left-corner check has been satisfied, then the top-down left-corner check is performed on the mother A of the proposed incomplete edge $<A \rightarrow .Y\alpha,k,j>$. This is indicated by block 162.

It is next determined whether the top-down left-corner check has been satisfied. If not, again the proposed incomplete edge is not added to the chart and the filtering procedure is complete. If so, however, then the proposed incomplete edge $<A \rightarrow .Y\alpha,k,j>$ is added to the chart. This is indicated by blocks 164 and 166 in FIG. 3A.

FIG. 3B is a more detailed flow diagram illustrating the performance of the bottom-up left-corner test on the prediction Y of the proposed incomplete edge. First, the next terminal in the input text is examined by parser 150. This is indicated by block 168 in FIG. 3B. The left-corner table is then accessed. The left-corner table, in one embodiment, can be thought of as a set of pairs of the form (X,Y), meaning that X is a left corner of Y. The left-corner table can be implemented, in one embodiment, in the form of nested hash tables. It is determined whether the left-corner table contains an entry for the pair consisting of the next input terminal and the left-corner of the prediction Y. If not, then the prediction Y cannot be correct and thus the proposed incomplete edge under consideration cannot be correct so it is not added to the chart. This is indicated by blocks 170 and 171 in FIG. 3B.

However, if the next input terminal and the prediction Y do satisfy the left-corner check, then the bottom-up left-corner test is satisfied and the top-down left-corner check can be performed. This is indicated by block 172 in FIG. 3B.

FIG. 3C illustrates the top-down left-corner check on the mother A of the proposed edge in greater detail. The top-down check is basically checking to see whether the mother of the proposed incomplete edge is consistent with edges previously found in the input text. Therefore, a prediction from the incomplete edges ending at the corresponding input position is selected from the chart. Next, the left-corner table is examined to see whether the mother A is a left corner of that prediction. This is indicated by blocks 174 and 176 in FIG. 3C. If not, then the production with A as its mother is inconsistent with the incomplete edges containing the selected prediction. This is repeated until a match is found or no predictions are left to be tested. At that point, if no match has been found, the top-down left-corner check is not satisfied. This is indicated by blocks 177 and 178, and the production is not added to the chart.

However, if the mother A is a left-corner of a prediction of an incomplete edge already in the chart ending at the corresponding input position, then the top-down left-corner test is satisfied, meaning that the production with A as its mother is, to this point, still consistent with edges that have already been found in the input text. This is indicated by block 180 in FIG. 3C.

Bottom-Up Prefix Merging

In left-to-right parsing, if two grammar productions share a common left prefix, e.g., A→BC and A→BD, many current parsing algorithms duplicate work for the two productions until reaching the point where they differ. A simple solution often proposed to address this problem is to "left factor" the grammar. Left factoring applies the following grammar transformation repeatedly, until it is no longer applicable.

For each nonterminal A, let $\alpha$ be the longest nonempty sequence such that there is more than one grammar production of the form A→$\alpha\beta$. Replace the set of productions A→$\alpha\beta_1$, . . . , A→$\alpha\beta_n$ with A→$\alpha$A', A'→$\beta_1$, . . . , A'→$\beta_n$, where A' is a new nonterminal symbol.

Left factoring applies only to sets of productions with a common mother category, but as an essentially bottom-up method, LC parsing does most of its work before the mother of a production is determined. Another grammar transformation was introduced in prior parsing techniques, as follows:

Let $\alpha$ be the longest sequence of at least two symbols such that there is more than one grammar production of the form A→$\alpha\beta$. Replace the set of productions $A_1$→$\alpha\beta_1$, . . . , $A_n$→$\alpha\beta_n$ with A'→$\alpha$, $A_1$→A'$\beta_1$, . . . , $A_n$→A'$\beta_n$ where A' is a new nonterminal symbol.

Like left factoring, this transformation is repeated until it is no longer applicable. While this transformation has been applied to left-corner stack based parsing it has never been applied to left-corner chart parsing. In that context, and in accordance with one embodiment of the present invention, it is referred to herein as "bottom-up prefix merging".

FIGS. 4 and 5 are flow diagrams illustrating the application of bottom-up prefix merging in accordance with one embodiment of the present invention. First, the productions in the grammar are examined to find multiple productions having the longest sequence of at least two similar symbols in the left-most position on the right hand side of the different productions. This is indicated by block 300 in FIG. 4. Then, the bottom-up prefix merging transformation is applied to those productions, regardless of whether the mother of the productions is the same. This is indicated by block 302. The transformed grammar productions are then output as the new grammar. This is indicated by block 304.

FIG. 5 is a flow diagram illustrating the application of the bottom-up prefix merging transformation in more detail. First, the set of productions in the grammar that have the form illustrated in block 306 are retrieved. The retrieved productions are transformed into productions of another form illustrated in block 308 of FIG. 5. The steps of retrieving the set of productions and transforming those productions are iterated on until the transform is no longer applicable. This is indicated by block 310 in FIG. 5.

It can thus be seen that this transformation examines the prefix of the right hand side of the productions to eliminate duplication of work for two productions that have a similar prefix on their right hand sides, regardless of the mother of the production.

It has been found experimentally that left factoring generally makes left-corner chart parsing slower rather than faster. Bottom-up prefix merging, on the other hand, speeds up left-corner chart parsing by as much as 70%.

Indexing Productions by Next Input Symbol

In general, it is most efficient to store the grammar productions for parsing in a data structure that partially combines productions that share elements in common, in the order that those elements are examined by the parsing algorithm. Therefore, the grammar productions for the present left-corner chart parser are stored as a discrimination tree, implemented as a set of nested hash tables. In addition, productions with only one daughter are stored separately from those with more than one daughter. One way to define a data structure for the latter is illustrated in FIG. 6A.

FIG. 6A shows that a first data portion in the data structure 200 is an index that contains pointers to data structures for productions indexed by their left-most daughter 202. This is because left-corner parsing proposes a grammar production when its left-most daughter has been found, so productions are indexed first by that. Data structure 200 also includes copies of a data structure 204, which indexes pointers to data structures for productions by a next daughter so that the input symbol can be checked against the next daughter to see whether the next daughter has the input symbol as a left corner. This is because when a production is proposed, the next daughter is checked to see whether it has the next input symbol as a left corner. This requires each entry in index 204 to be checked against the next input symbol.

Data structure 200 also includes copies of a data structure 206, which indexes pointers to data structures for productions by the mother of the productions. This is so that a top-down check can be preformed to see whether the mother is a left corner of some previous prediction. This ensures that the mother of the production is consistent with what has been found in the chart so far. Finally, the remaining portions of the productions are enumerated. This is indicated by data portion 208 and data structure 200.

FIG. 6B illustrates the direction of tracing through the data structure 200 in performing the various checks just described. FIG. 6B further illustrates that each data structure holds a set of pointers to data structures for productions based upon the index criteria. For example, data portion 202 holds pointers to data structures for productions based on the left corner of those productions. Therefore, as the input text is being analyzed, data portion 202 is accessed and the partial analysis of the input text is compared against the values in data portion 202. When a match is found, the pointer associated with that match is provided such that productions are identified that satisfy the left corner criteria indexed in data portion 202.

The pointer, in one embodiment, points to a copy of data portion 204 that indexes the productions by the possible next daughters for productions having the left corner matched in data portion 202. When a match is found in performing the left-corner check against the next input symbol, a pointer is obtained which points to a copy of data portion 206 that indexes productions with the given left corner and next daughter by their mother such that a determination can be made as to whether the currently hypothesized productions are consistent with what has been previously identified (i.e., whether the mother of the production is the left corner of some previous prediction). Finally, the remainders of the productions with a given left corner, next daughter, and mother are retrieved from the values in a copy of data portion 208.

A way to store the productions that results in faster parsing, in accordance with one embodiment of the present invention, is to precompute which productions are consistent with which input symbols, by defining a structure that for each possible input symbol contains a discrimination tree just for the productions whose second daughters have that input symbol as a left corner. This entire structure is therefore set out in the order shown for structure 212 in FIG. 7A:

As the parser works from left to right, at each point in the input, it looks up the sub-structure for the productions consistent with the next symbol in the input. It processes them as before, except that the check that the second daughter has the next input symbol as a left corner is omitted, since that check was precomputed.

FIGS. 7A and 7B illustrate data structure 212 used in accordance with one embodiment of the present invention. Data portions which are the same as those found in FIGS. 6A and 6B are correspondingly numbered. However, rather than beginning by indexing the productions according to the left corner (or left-most daughter), data structure 212 begins by indexing productions whose second daughters have, as a left corner, the next input symbol. This is indicated by data portion 214. In one embodiment, data portion 214 holds pointers to data structures for productions that have the next input symbol as a left corner to its second daughter. These pointers, in one embodiment, point to copies of data portion 202 that point to copies of data portions 206, and so on. The analysis then continues as discussed with respect to FIG. 6B, through the data portions 206 and 209. It will be noted that data portion 209 now also contains the second daughters that were separated out in the original method of indexing described with respect to FIGS. 6A and 6B.

This way of indexing the productions can tend to increase storage requirements. However, since the entire structure is indexed first by input symbol, it is only necessary to load that part of the structure indexed by symbols that actually occur in the text being parsed. The part of the structure for the most common words of the language are illustratively pre-loaded; and since words seen once in a given text tend to be repeated, all of the structure that is loaded is illustratively retained until processing is complete or until it switches to an unrelated text.

Grammar Flattening

One possible way of reducing the amount of work a parser has to do is to remove levels of structure from the grammar. For example, instead of the productions:
NP→Name
Name→john
Name→mary One could omit the category Name altogether, and simply use the productions:
NP→john
NP→mary Techniques for removing levels of structure from the grammar can be referred to by the general term "grammar flattening".

Figure 8:
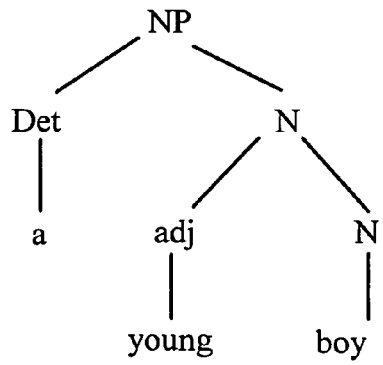
FIGS. 8 and 9 illustrate grammar flattening.
Figure 9:
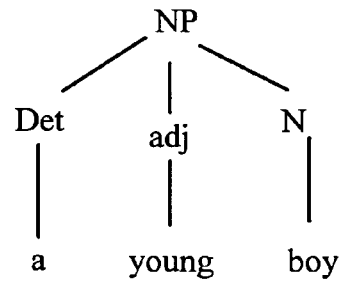

FIGS. 8 and 9 are graphs which further illustrate the concept of grammar flattening for the phrase "a young boy". In FIG. 8, the head node of the graph is a noun phrase and it extends four levels deep, ending with the words in the phrase. In FIG. 9, the grammar has been flattened such that it extends only three levels deep. In FIG. 9, the graph has a noun phrase head node and three descendent nodes (a determiner, an adjective, and a noun). The actual words in the phrase "a young boy" descend from these three descendent nodes.

In general, grammars can be flattened by taking a production, and substituting the sequence of daughters in the production for occurrences of the mother of the production in other productions. This does not always result in faster parsing.

However, in accordance with the embodiments of the present invention, a number of specific ways of grammar flattening have been developed that are effective in speeding up left-corner chart parsing. The first method is referred to as "elimination of single-option chain rules". If there exists a nonterminal symbol A that appears on the left-hand side of a single production A→X, where X is a single terminal or nonterminal symbol, A→X is referred to as a "single-option chain rule". Single option chain rules can be eliminated from a context-free grammar without changing the language allowed by the grammar, simply by omitting the production, and substituting the single daughter of the production for the mother of the production everywhere else in the grammar.

Elimination of single-option chain rules is perhaps the only method of grammar flattening that is guaranteed not to increase the size or complexity of the grammar. Grammar flattening involving nonterminals defined by multiple productions can result in a combinatorial increase in the size of the grammar. However, in accordance with one embodiment of the present invention, it has been found that if flattening is confined to the leftmost daughters of productions, increased parsing speeds can be achieved without undue increases in grammar size. These techniques are referred to herein as "left-corner grammar flattening". Two techniques of left-corner grammar flattening that generally speed up left-corner chart parsing are as follows:

Technique 1: For each nonterminal A, such that
A is not a left-recursive category and
A does not occur as a daughter of a rule except as the left-most daughter, do the following:
For each production of the form A→$X_1 \ldots X_n$ and each production of the form B→Aα, add B→$X_1 \ldots X_n$α to the grammar.
Remove all productions containing A from the grammar.
Technique 2: For each nonterminal A, such that A is not a left-recursive category, A does not occur as a daughter of a rule except as the left-most daughter, and there is some production that has A as the mother and at least one nonterminal as a daughter, do the following:

For each production of the form $A \rightarrow X_1 \ldots X_n$ and each production of the form $B \rightarrow A\alpha$, add $B \rightarrow X_1 \ldots X_n\alpha$ to the grammar.

Remove all productions containing A from the grammar.

Figure 10:
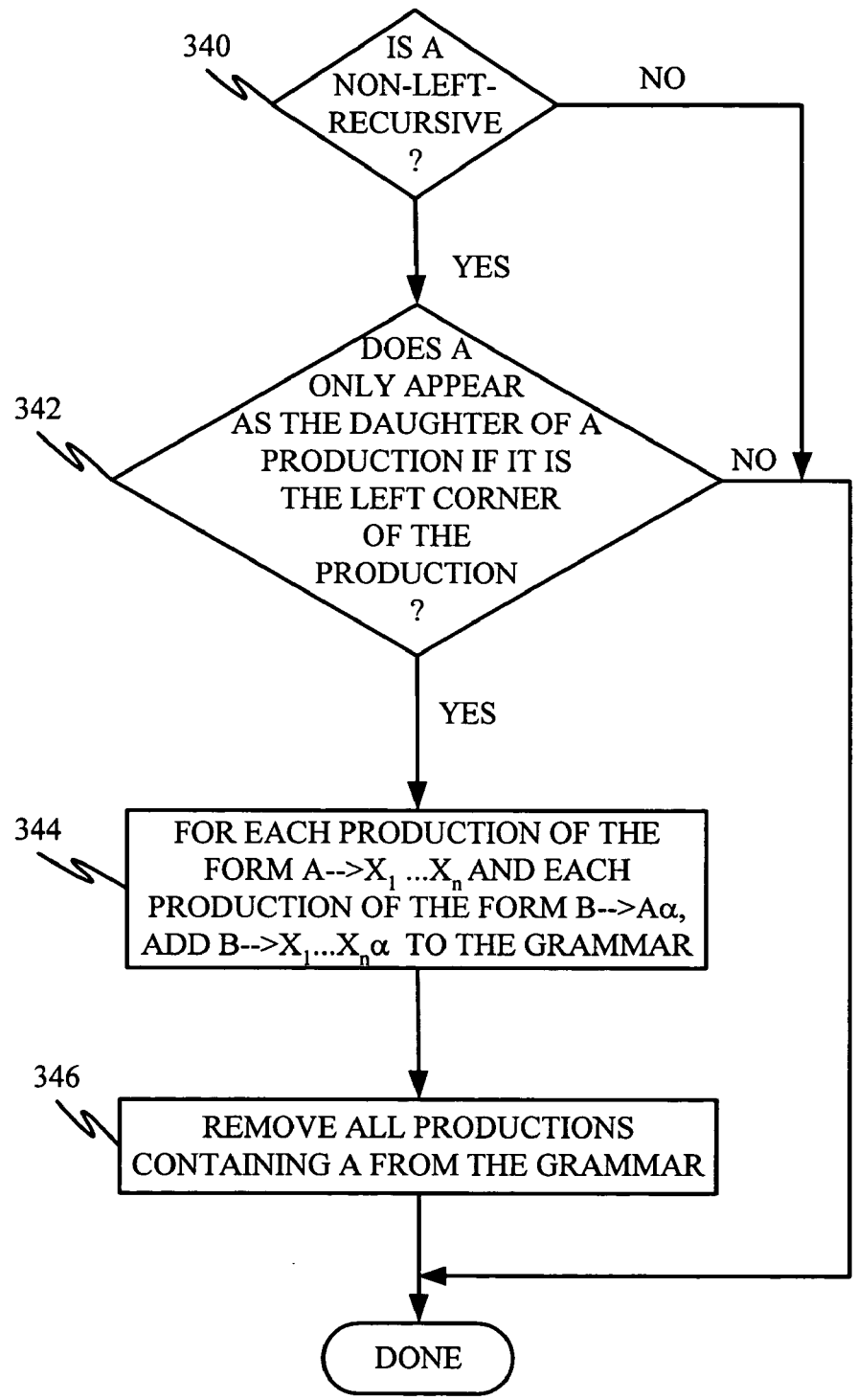
FIGS. 10 and 11 illustrate methods of performing grammar flattening in accordance with embodiments of the present invention.
Figure 11:
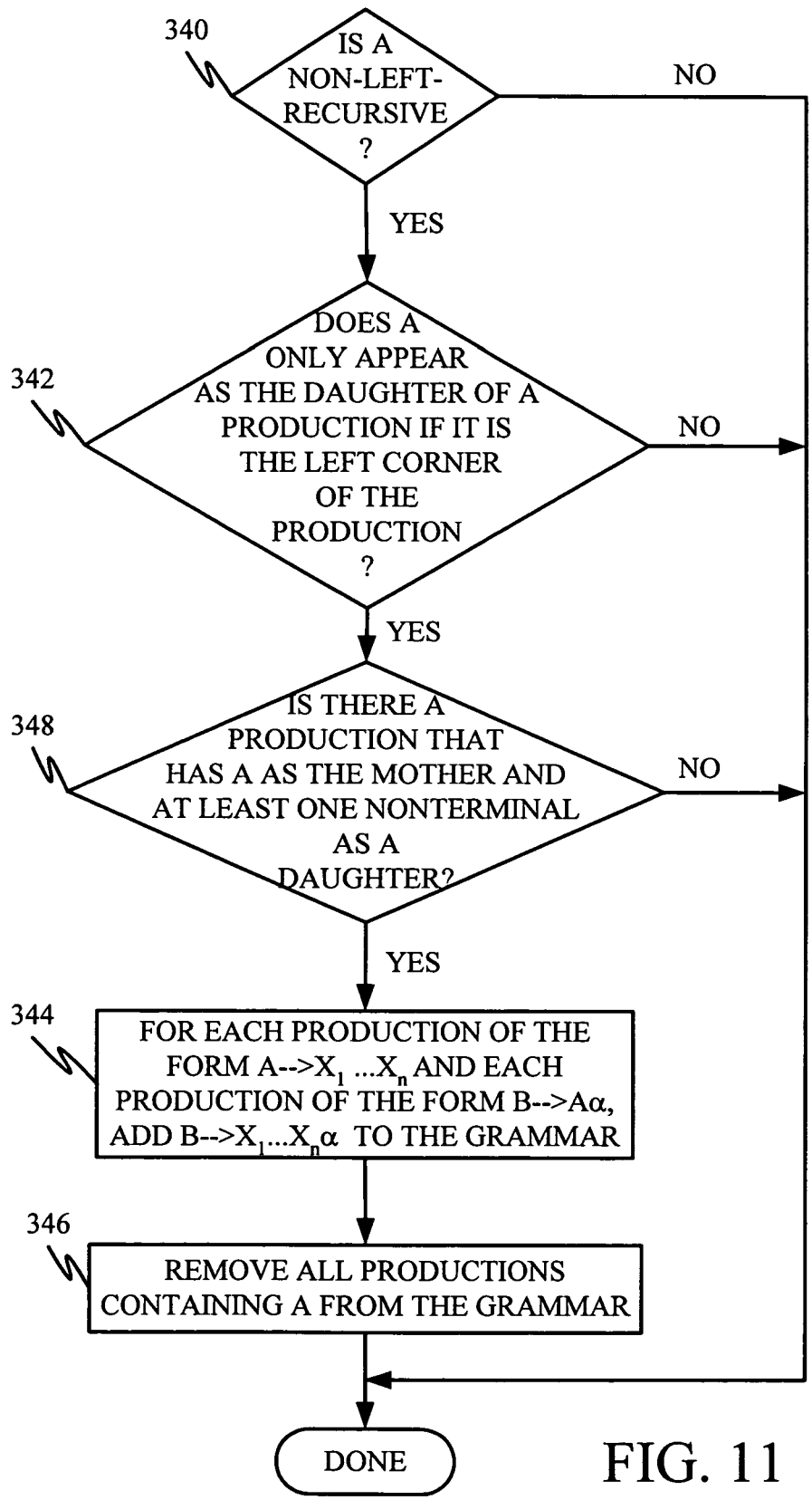

FIGS. 10 and 11 are flow diagrams illustrating techniques 1 and 2 discussed above, in greater detail. Techniques 1 and 2 restrict the implementation of the grammar flattening to only non-left-recursive categories and only if those categories only appear in a left corner position. Further, according to technique 2, the flattening operation is only preformed if the category has at least one daughter that is also a category. This additional restriction makes parsing slightly slower, but results in a much more compact grammar.

Therefore, technique 1 discussed above first determines whether the category is a non-left-recursive category. This is indicated by block 340 in FIG. 10. If not, the grammar flattening operation is not preformed. If so, then it is determined whether the category only appears as a daughter of a production if it is the left corner of that production. This is indicated by block 342. If not, again the flattening operation is not preformed.

If so, however, then the grammar is first flattened by adding productions, as identified in block 344, and then removing all productions containing the identified category from the grammar. This is indicated in block 346.

Technique 2, illustrated in FIG. 11, has a number of steps which are similar to those found in technique 1, illustrated in FIG. 10. Those steps are similarly numbered. Therefore, technique 2 first determines whether the category A is non-left-recursive and whether A only appears as a daughter of a production if it is the left corner of the production. This is indicated by blocks 340 and 342. However, FIG. 11 illustrates that, prior to performing the grammar flattening, it is determined whether there is a production that has the category A as its mother and at least one non-terminal as a daughter. This is indicated by block 348. If not, then the grammar flattening step would only minimally speed up parsing, at the expense of significantly increasing the grammar size, so the grammar flattening step is not performed. If so, however, then the two steps illustrated by blocks 344 and 346 in which productions are added to the grammar and all productions containing the category A are removed from the grammar (as discussed with respect to FIG. 10) are preformed.

It should be noted that a nonterminal is left-recursive if it is a proper left corner of itself, where X is recursively defined to be a proper left corner of A if the grammar contains a production of the form $A \rightarrow X\alpha$ or a production of the form $B \rightarrow X\alpha$, where B is a proper left corner of A. This and the elimination of left recursion are discussed in greater detail in the above-referenced co-pending patent application.

Annotating Chart Edges for Extraction of Parses

The previously mentioned prior art technique of omitting recognized daughters from items leads to issues regarding how parses are to be extracted from the chart. The daughters to the left of the dot in an item are often used for this purpose in item-based methods. However, other methods suggest storing with each non-initial edge in the chart a list that includes, for each derivation of the edge, a pair of pointers to the preceding edges (complete and incomplete edges) that caused it to be derived. This provides sufficient information to extract the parses without additional searching, even without the daughters to the left of the dot.

One embodiment of the present invention yields further benefits. For each derivation of a non-initial edge, it is sufficient to attach to the edge, by way of annotation, only the mother category and the starting position of the complete edge that was used in the last step of the derivation. It should also be noted that in left-corner parsing, only non-initial edges are ever added to the chart; however, this technique for annotating chart edges and extracting parses also works for other parsing methods that do create initial edges in the chart.

Figure 12A:
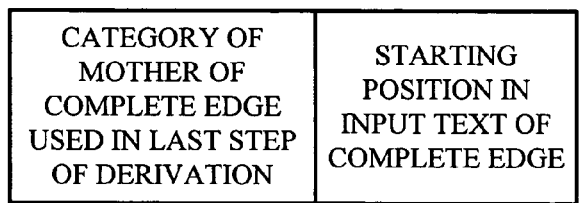
FIG. 12A is a data structure used in annotating chart edges in accordance with one embodiment of the present invention.

FIG. 12A illustrates a data structure 350 which is attached to (or pointed to by) an edge in a chart being developed. Data structure 350 simply includes two portions. The first portion 352 contains the category of the mother of the complete edge used in the last step of deriving the non-initial edge. The second data portion 354, simply contains the starting position in the input text of the complete edge, the mother of which is identified in portion 352. By storing one of these structures for each derivation of an edge, the edges can be traced back to obtain a full analysis of the input text.

Every non-initial edge is derived by combining a complete edge with an incomplete edge. Suppose $<A \rightarrow .\beta,k,j>$ is a derived edge, and it is known that the complete edge used to derive this edge had category X and start position i. It is then known that the complete edge must have been $<X,i,j>$, since the complete edge and the derived edge must have the same end position. It is further known that the incomplete edge used in the derivation must have been $<A \rightarrow .X\beta,k,i>$, since that is the only incomplete edge that could have combined with the complete edge to produce the derived edge. Any complete edge can thus be traced back to find the complete edges for all the daughters that derived it. The trace terminates when an incomplete edge is reached that has the same start point as the complete edge it was derived from. These "local" derivations can be pieced together to obtain a full analysis of the input text.

Figure 12B:
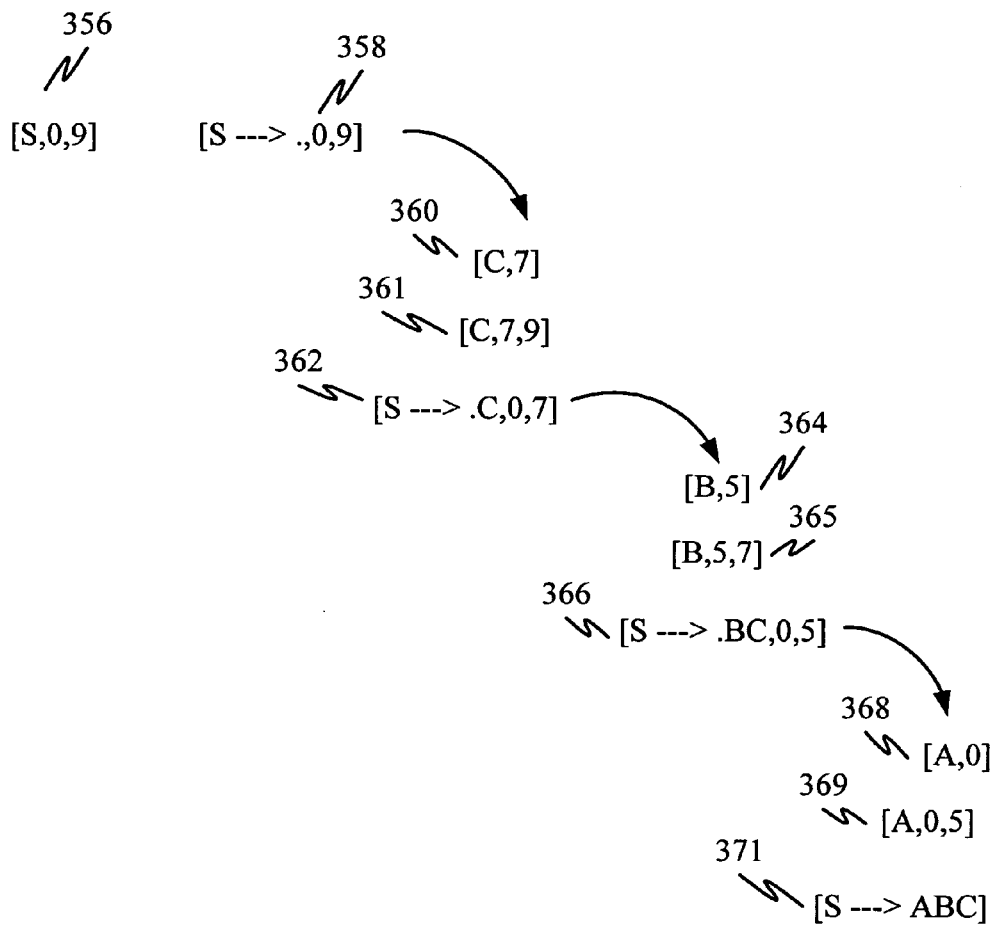
FIG. 12B illustrates a trace-back of chart edges to obtain an analysis of an input text in accordance with one embodiment of the present invention.

For example, suppose that one has derived a complete edge $<S,0,9>$ as illustrated in FIG. 12B, which we can also show as 358 (written in expanded notation). It can be seen that if the data structure 360 (representing the last complete edge used in deriving edge 358) is attached to 358, where 7 is the beginning or initial position of a complete edge of category C, then one knows that 358 must have been derived by combining the complete edge $<C,7,9>$, 361, and the incomplete edge $<S \rightarrow .C,0,7>$, 362. If the incomplete edge 362 occurs in the chart with the data structure 364 attached, one can see that 362 must have been derived from the complete edge $<B,5,7>$, 365, and the incomplete edge $<S \rightarrow .BC,0,5>$, 366. Then if the data structure 368 is attached to 366, one can see that 366 must have been derived from the complete edge $<A,0,5>$, 369, and the production $S \rightarrow ABC$, 371. One can tell that this was a production rather than another non-initial incomplete edge, because 368 and 366 have the same start point. Thus we know that the original complete edge $<S,0,9>$ was derived from the sequence of complete edges $<A,0,5>$, $<B,5,7>$, and $<C,7,9>$. Since the categories of these complete edges may not be terminals, the trace-back process may need to be repeated for one or more of these complete edges as well. Using the derivation data structures attached to the chart records for these edges, we can recursively extract the complete analysis of the entire sentence, down to the level of words.

Figure 13:
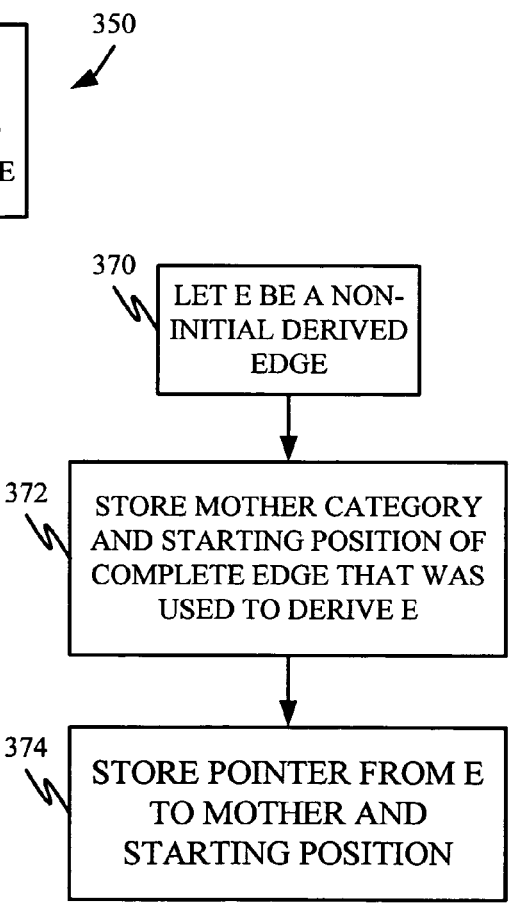
FIGS. 13, 14A and 14B illustrate the trace-back of chart edges, using annotations on those edges, in accordance with another embodiment of the present invention.

FIG. 13 is a flow diagram illustrating how the information for the complete edges is stored. When a non-initial edge E is derived and added to the chart, (as indicated by block 370) the mother category and the starting position of the complete edge that was used to derive the non-initial edge E are stored in the form of the data structure 350 illustrated in FIG. 12A. This is indicated by block 372. Finally, a pointer from the derived edge E to the mother and starting position stored at block 372 are also stored. This is indicated by block 374. It can thus be seen that data structure 350 is quite abbreviated, and no pointer to an incomplete edge is even needed.

Figure 14A:
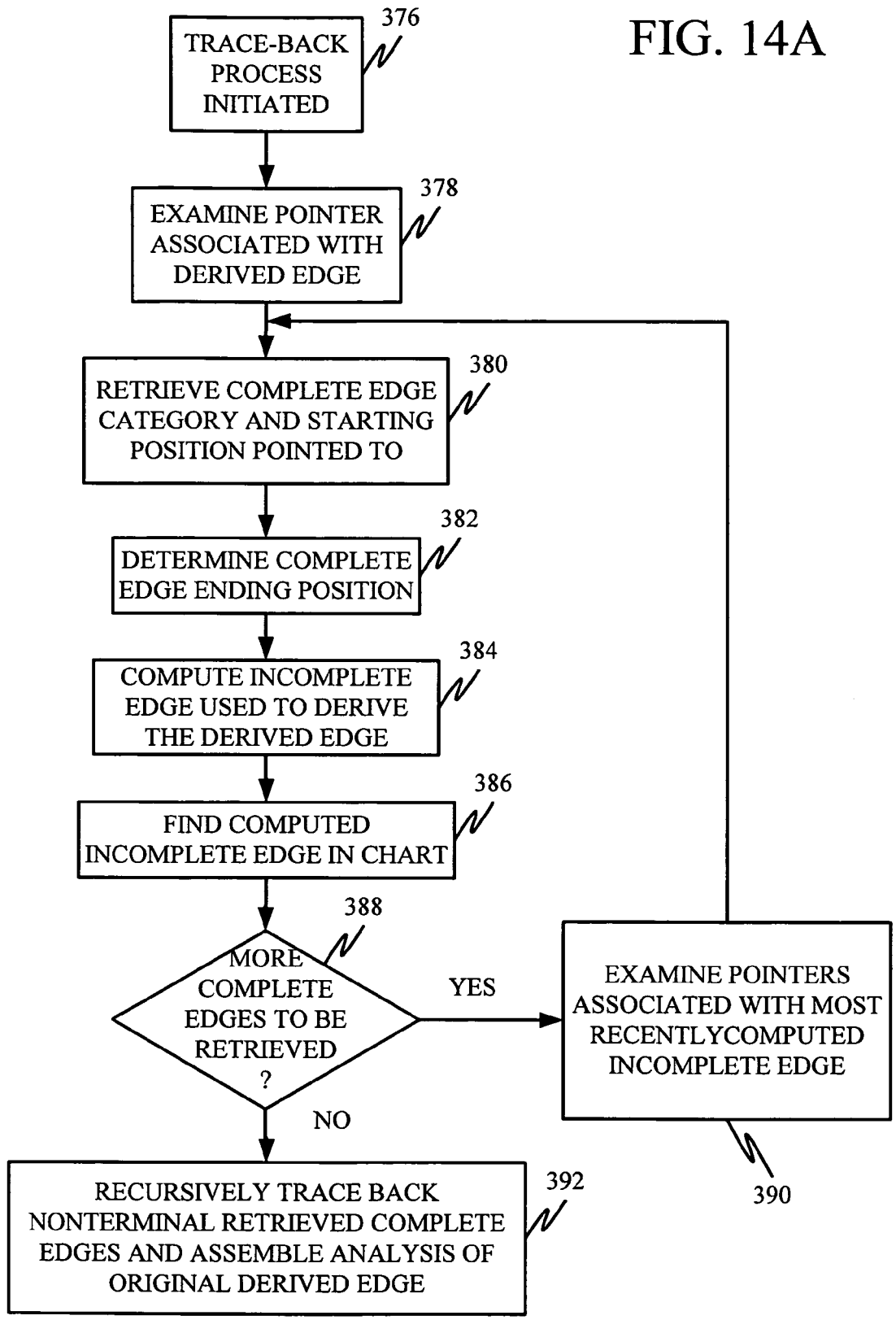
Figure 14B:
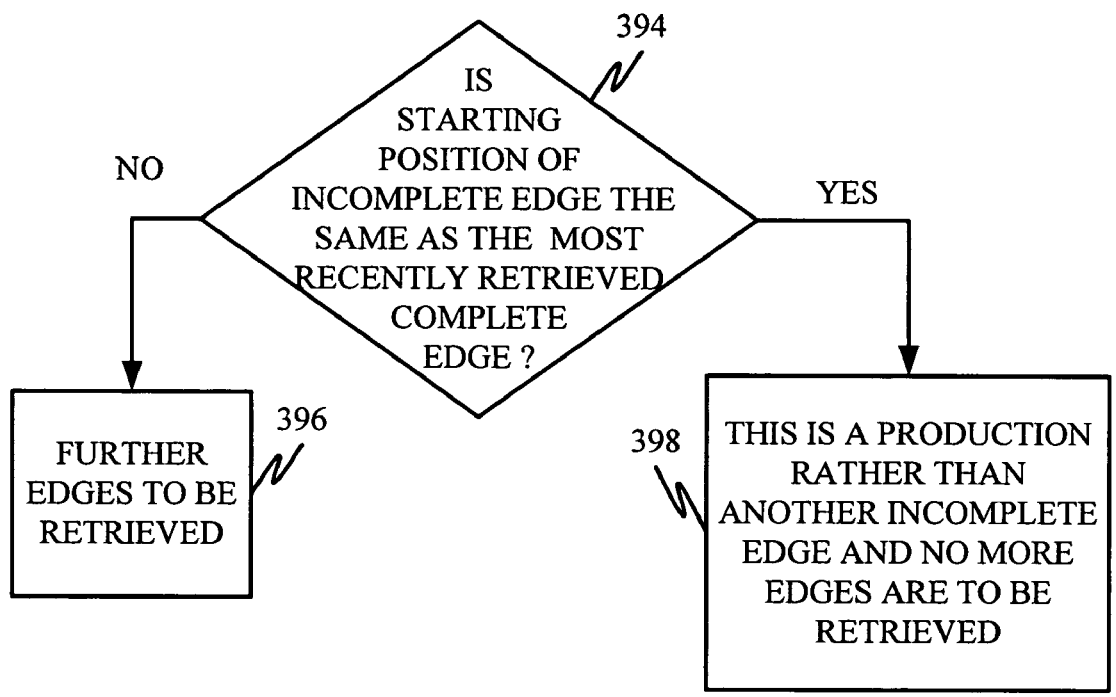

FIGS. 14A and 14B are flow diagrams which better illustrate the trace-back process. First, in general, parsing proceeds left to right until there are no more words in the input sentence. Then it can be determined whether there is a complete parse of the input by examining the chart to see if there is a complete edge of category S spanning the entire input, from 0 to n, if there are n words in the input sentence. If the application needs to retrieve the analyses of the sentence at this point, then it initiates the trace-back process, beginning with the complete edge <S,0,n>. Initiation of the trace-back process is indicated by block 376. The pointer to the derivation data structure associated with the derived edge currently under consideration is examined as indicated by block 378. The edge category and its starting position for some derivation of the edge, which are pointed to at block 378, are then retrieved. This is indicated by block 380. It should be noted that an edge may have several derivations, with a category/starting position pair stored for each derivation. If one chooses only one pair for each edge, a single analysis for the sentence is obtained. To obtain all analyses, one must iterate through all derivations. The ending position of the complete edge is then determined based on the ending position of the derived edge. This is indicated by block 382. The incomplete edge used in the most recent derivation is computed. This is indicated by block 384. The computed incomplete edge is then located in the chart, and it is determined whether more complete edges need to be retrieved. This is indicated by blocks 386 and 388. If so, the pointers associated with the most recently computed incomplete edge are examined for the location of the next edge category and starting position which needs to be retrieved. This is indicated by block 390. Processing then reverts to block 380 wherein the complete edge category and its starting position are retrieved.

After all of the complete edges that compose the original derived edge have been retrieved, the ones for nonterminal categories are traced back recursively and the results are assembled into a complete analysis of the edge originally being traced back. This is indicated by block 392.

FIG. 14B is a more detailed flow diagram illustrating how the decision in block 388 is made (and consequently how the trace-back terminates). It is determined whether the starting position of the most recently computed incomplete edge is the same as the most recently retrieved complete edge which it was derived from. This is indicated by block 394 in FIG. 14B. If the starting positions are not the same, then additional edges need to be retrieved in order to obtain the full analysis of the input text segment. This is indicated by block 396. If the starting positions are the same, then the most recent computation has yielded a production rather than an incomplete edge and no more edges need to be retrieved at this level of processing.

It can thus be seen that the present invention provides a number of techniques and embodiments for improving the speed and efficiency of parsing, and in some cases, specifically left-corner chart parsing. These improvements have been seen to increase the speed of the left-corner chart-parsing algorithm by as much as 40 percent over the best prior art methods currently known. These techniques can be used alone or in any combination of ways to obtain advantages and benefits over prior left-corner chart parsers.

Although the present invention has been described with reference to preferred embodiments, workers skilled in the art will recognize that changes may be made in form and detail without departing from the spirit and scope of the invention.

What is claimed is:

1. A method of indexing productions for use in a left-corner chart parser which parses input text containing input symbols, the method comprising:
   indexing the productions first based on input symbols which are consistent with the productions by:
   precomputing which of the productions are consistent with which of the input symbols, wherein precomputing comprise precomputing, for each possible input symbol, which productions have a second daughter with that input symbol as a left corner; and
   generating a data structure that, for each of the possible input symbols, includes a discrimination tree just for productions having a second daughter with that input symbol as a left corner.

2. The method of claim 1 and further comprising:
   indexing the productions next based on a left-most daughter of the productions.

3. The method of claim 2 and further comprising:
   indexing the productions next based on a mother of the productions.

4. The method of claim 3 and further comprising:
   enumerating the productions based on remainder of the productions, other than the left-most daughter and the mother.

5. A method of parsing input text using a left-corner chart parsing process, comprising:
   receiving an input symbol in the input text;
   accessing an input symbol index, wherein the input symbol index comprises a portion of a discrimination tree for only productions having a second daughter with the input symbol as a left corner of the second daughter, and wherein accessing the index comprises traversing the discrimination tree;
   to obtain productions having the input symbol as a left corner of the second daughter; and
   after obtaining the productions having the input symbol as a left corner of the second daughter, accessing other indices to the productions.

6. The method of claim 5 wherein accessing other indices comprises:
   accessing a left-most daughter index to obtain productions based on their left-most daughter.

7. The method of claim 6 wherein accessing other indices comprises:
   accessing a mother index to obtain productions based on their mother.

8. The method of claim 7 and further comprising:
   accessing a list containing a completion of productions that are obtained by accessing the left-most daughter index and the mother index.

9. A data structure indexing productions used in a left-corner chart parser which parses input text, the data structure comprising:
   a first index portion indexing the productions first based on input symbols which are consistent with the productions wherein the first index portion indexes productions by input symbol based on which productions have the input symbol as a left corner of the second daughter;

a second index portion indexing the productions based on a left-most daughter of the productions;

a third index portion indexing the productions based on a mother of the productions;

a fourth portion enumerating the productions based on a remainder of the productions, other than the left-most daughter and the mother of the productions; and wherein the first, second, third and fourth portions comprise a discrimination tree implemented as a set of nested hash tables.

* * * * *